(12) United States Patent
Hoetzer et al.

(10) Patent No.: US 7,198,589 B2
(45) Date of Patent: Apr. 3, 2007

(54) ELECTRIC MOTOR COUPLED TO AN INTERNAL COMBUSTION ENGINE IN A MOTOR VEHICLE

(75) Inventors: Dieter Hoetzer, Schwieberdingen (DE); Martin Eisenhardt, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 563 days.

(21) Appl. No.: 10/432,753

(22) PCT Filed: Sep. 18, 2002

(86) PCT No.: PCT/DE02/03488

§ 371 (c)(1),
(2), (4) Date: Nov. 12, 2003

(87) PCT Pub. No.: WO03/031218

PCT Pub. Date: Apr. 17, 2003

(65) Prior Publication Data

US 2004/0069547 A1  Apr. 15, 2004

(30) Foreign Application Priority Data

Sep. 29, 2001  (DE) .............................. 101 48 345

(51) Int. Cl.
*B60K 1/02* (2006.01)
(52) U.S. Cl. .......................................... 477/3; 477/904
(58) Field of Classification Search .................... 477/3, 477/5, 904–5
See application file for complete search history.

(56) References Cited

U.S. PATENT DOCUMENTS

| | | | | |
|---|---|---|---|---|
| 5,337,848 A | * | 8/1994 | Bader | 477/5 |
| 5,463,294 A | | 10/1995 | Mohler et al. | |
| 5,775,449 A | * | 7/1998 | Moroto et al. | 477/5 |
| 5,841,201 A | * | 11/1998 | Tabata et al. | 180/65.4 |
| 5,903,061 A | * | 5/1999 | Tsuzuki et al. | 477/20 |
| 5,959,420 A | * | 9/1999 | Boberg et al. | 318/432 |
| 6,234,932 B1 | | 5/2001 | Matsubara et al. | |
| 6,263,273 B1 | * | 7/2001 | Henneken et al. | 477/904 |
| 6,322,476 B1 | * | 11/2001 | Kahlon et al. | 477/3 |
| 6,484,833 B1 | * | 11/2002 | Chhaya et al. | 180/65.2 |

FOREIGN PATENT DOCUMENTS

| | | |
|---|---|---|
| EP | 1 127 730 | 8/2001 |
| EP | 1127730 A1 * | 8/2001 |
| JP | 09 322305 | 12/1997 |

* cited by examiner

*Primary Examiner*—Roger Pang
(74) *Attorney, Agent, or Firm*—Kenyon & Kenyon LLP

(57) ABSTRACT

An electric machine coupled to an internal combustion engine in a motor vehicle, a control unit being provided for specifying an optimal efficiency operating state or for specifying a dynamically optimal operating state for the electric machine. Switchover means are used for switching over the usually specified optimal efficiency operating state to the dynamically optimal operating state before operating procedures in the motor vehicle which require a rapid torque setting.

17 Claims, 2 Drawing Sheets

ELECTRIC MOTOR COUPLED TO AN INTERNAL COMBUSTION ENGINE IN A MOTOR VEHICLE

BACKGROUND INFORMATION

In today's motor vehicles, the driving internal combustion engine is usually provided with a starter motor, and in addition, it drives a generator via a belt pulley. In future vehicle concepts, increasingly powerful electrical machines are installed which replace both the present generator and the conventional starter motor. Besides the internal combustion engine, if these electrical machines also contribute to driving the motor vehicle, as a rule, one speaks of hybrid vehicles. Among hybrid vehicles, parallel hybrids are known, for example, in which, in addition to the internal combustion engine, one or more electrical machines are integrated into the power train. Power-splitting hybrid concepts are also known, in which two electrical machines are mounted in such a way that the mechanical power originating from the internal combustion engine contributes both directly and indirectly to the driving power at the wheels, via the two electrical machines.

Such electrical machines could, in principle, be operated in different types of operation and operating conditions, such as in a dynamically optimal operating state or in an optimal efficiency operating state. The dynamically optimal operating state stands out in that an engine torque build-up can take place very rapidly in response to a corresponding requirement, for instance, having a time factor of 5–10 ms. What is disadvantageous about the dynamically optimal operating state is the poor efficiency, since thereby the flux-forming current component is generally held at its nominal value, that is, independent of a torque requirement. In the optimal efficiency operating state there is a favorable efficiency, but on the other hand one may expect a torque-setting time that is longer by a factor of 10.

SUMMARY OF THE INVENTION

The system according to the present invention has the advantage that, in the normal case, the electrical machine or the electrical machines are driven in optimal efficiency operation at favorable efficiency. Only when a rapid torque setting becomes necessary, because of corresponding processes in the motor vehicle, is there an automatic switchover to the dynamically optimal operating state, so that when needed, a rapid torque setting or a rapid torque build-up is ensured. Since, all in all, these processes occupy only a small fraction of the time, at least one electrical machine works here at good efficiency overall. In this context, the changeover takes place in such a timely fashion that it is concluded by the time the rapid torque setting is actually required.

Control signals specifying switchover before gearshift processes and/or starting processes of the internal combustion engine and/or acceleration processes of the internal combustion engine are preferably able to be supplied to a switchover control input of the switchover means. This switchover control input may, of course, also be designed, for example, as a bus connection. In this context, a central vehicle control and/or a transmission control device and/or a switching device able to be operated before the starting process or the acceleration process is expediently designed to form the control signals specifying the switchover.

In an advantageous manner, means for switchover to the dynamically optimal operating state for a specified time or until the close of the respective operating process, which requires a rapid torque setting, is also provided.

In order to be able to set the operating states in each case, the control unit is designed to specify the flux-forming current and the torque-forming current for the electrical machine.

For this purpose, the control unit has means for the specification of a pair of values for the flux-forming and the torque-forming current as a function of the respective torque requirement in the functionally optimal operating state, and for the specification of nominal values for the flux-forming current and a torque-forming current being a function of the respective torque requirement in the dynamically optimal operating state.

In one advantageous embodiment, the electrical machine is connected between the internal combustion engine and an automatic vehicle transmission, a coupling being provided at least between the electrical machine and the internal combustion engine. In this manner, the electrical machine is able to effectively support the switching processes and speed them up.

The electrical machine, in an advantageous manner, also forms a generator or a motor, depending on the respective requirement or operating state.

DETAILED DESCRIPTION

Figure 1:
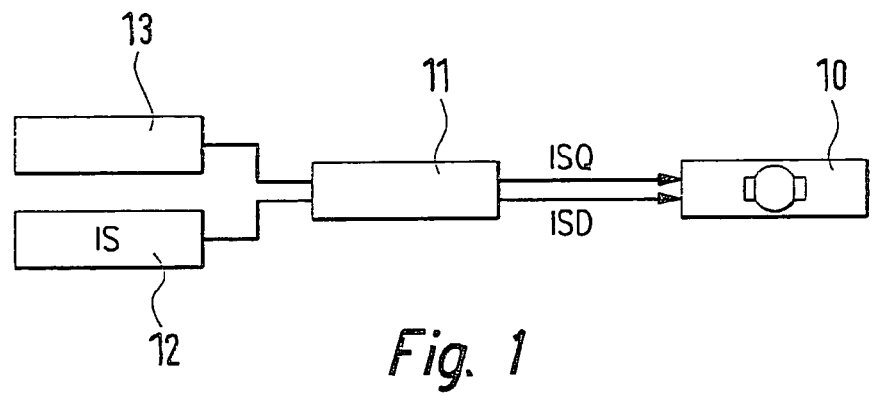
FIG. 1 shows a schematic representation of the means for controlling the electrical machine.

The schematic block diagram as in FIG. 1 is intended to explain the dynamically optimal operating state and the optimal efficiency operating state of an electrical machine 10. The latter is connected to an electronic control unit 11, which, in turn, is connected to a current source or sink 12 via a power cable. Furthermore, electronic control unit 11 is connected to a central vehicle control 13, such as via a CAN bus. Torque-forming current ISQ and flux-forming current ISD are specified for electrical machine 10 by electronic control unit 11. In this context, magnetizing current Iμ for electrical machine 10 is the flux-forming current ISD delayed by the rotor time constant (ca 100 to 150 ms). The torque equation of an asynchronous motor used, for example, as electric machine 10 is:

$$M = K \times ISQ \times I\mu.$$

In the dynamically optimal operating state, the flux-forming current ISD, and thus Iμ, is fixed to its nominal value and held constant independently of a torque requirement. Torque changes take place via a change in torque-forming current ISQ. This goes very fast, and time constants are able to be achieved which are smaller than the rotor time constants approximately by a factor of 10.

In the optimal efficiency operating state, on the other hand, one may expect a longer torque setting time or time constant, which is approximately equivalent to the rotor time constant. In this case, for each torque requirement a value pair ISD and ISQ is specified which results in the best efficiency for the desired torque. This may be done, for example, via a characteristics map or by making calculations using appropriate computational rules. By comparison to the dynamically optimal operating state, the overall efficiency is clearly better, particularly in the partial load operation of the electric machine.

According to FIG. 1, for example, central vehicle control 13 specifies whether electric machine 10 is to operate in dynamically optimal or the optimal efficiency operation. The appropriate control command may be supplied to a switchover control input of electrical control unit 11 or to a corresponding bus interface.

Electrical machine 10 may be connected to the internal combustion engine of a motor vehicle directly or or via a coupling, and, in this context, is used both as a starter motor and a current generator. The corresponding switchover from motor operation to generator operation may also be carried out by electronic control unit 11. The coupling may, for example, be disengaged after the starting process, unless, as in certain cases, electric machine 10 is supposed to contribute to propulsion, such as during acceleration.

Instead of one single electric machine 10, several electric machines may, of course, also be connected to the internal combustion engine.

As a rule, electric machine 10 is operated at optimal efficiency, in order to achieve as low as possible a use of fuel or as high as possible an efficiency. To be sure, there are vehicle conditions in which a rapid torque setting is of great advantage. An example of this is the starting procedure for the internal combustion engine. In this context, electric machine 10 is transferred into the dynamically optimal operating state even before the activation of the starting procedure. This switchover may be made, for example, by operating the ignition key or even by a door switch when the vehicle door is opened. After the starting process has taken place, and successfully so, one then carries out again a switchover to an operating state of optimal efficiency. This may be done either depending on rotational speed or controlled by time.

Figure 2:
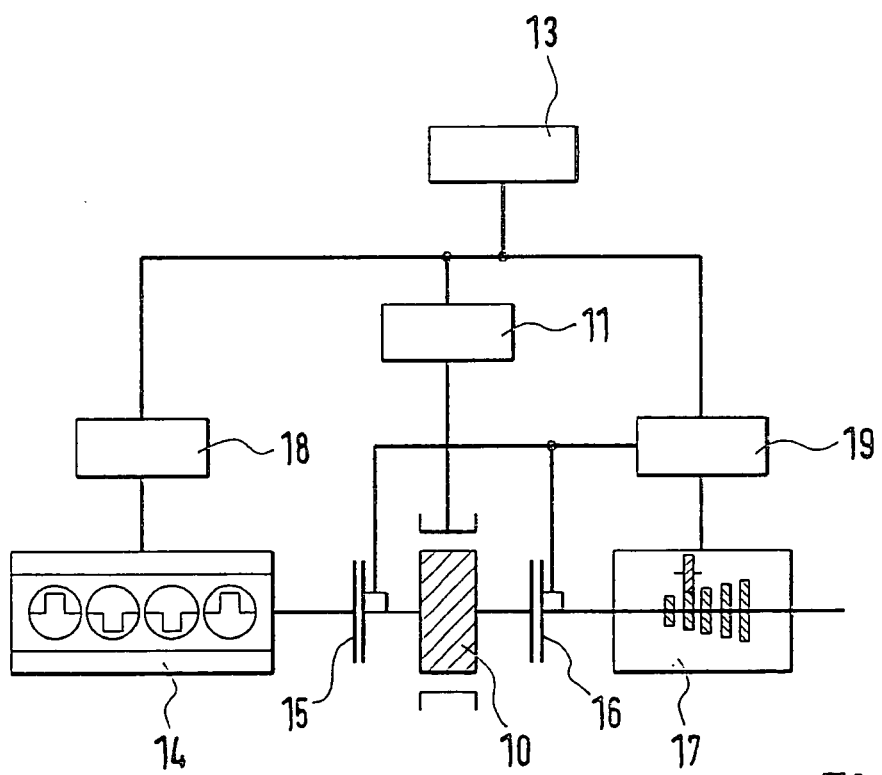
FIG. 2 shows an exemplary embodiment of an electrical machine connected between an internal combustion engine and an automatic transmission.

A further example, in which the switchover to a dynamically optimal operating state is of advantage is explained below in the light of FIG. 2. According to FIG. 2, an internal combustion engine 14 is connected via a first coupling 15 to electric machine 10, which is further connected via a second coupling 16 to an automatic or automated standard transmission 17. Such an arrangement is designated as a parallel hybrid arrangement, second coupling 16 being able to be omitted too, in a simpler execution. Internal combustion engine 14 is controlled by an engine control unit 18, electric machine 10 is controlled by electrical control unit 11 and standard transmission 17 is controlled by a transmission control device 19. In this context, central vehicle control 13 coordinates the functions of engine control unit 18, electronic control unit 11 and transmission control unit 19. Transmission control unit 19 is additionally used for operating couplings 15, 16.

During a shifting procedure of standard transmission 17, electric machine 10 may, or when second coupling 16 is omitted, must contribute to active synchronization by inertia that is great in comparison with the transmission input shaft. In order for the shifting process to proceed as quickly as possible, and so that the interruption of traction is held to as short as possible, electric machine 10 ought to be in dynamically optimal operation even before the shifting procedure. A rapid torque setting during the active synchronization also guarantees a better regulating behavior, particularly even when electric machine 10 or an additional, further electric machine is operated at regulated rotational speed.

After the driver, in an automated transmission 17, or the shifting electronics in a fully automatic transmission, initiates shifting, the switchover is brought into dynamically optimal operation by a corresponding signal at the switchover input of electronic control unit 11. The active synchronization takes place at the same time.

Figure 3:
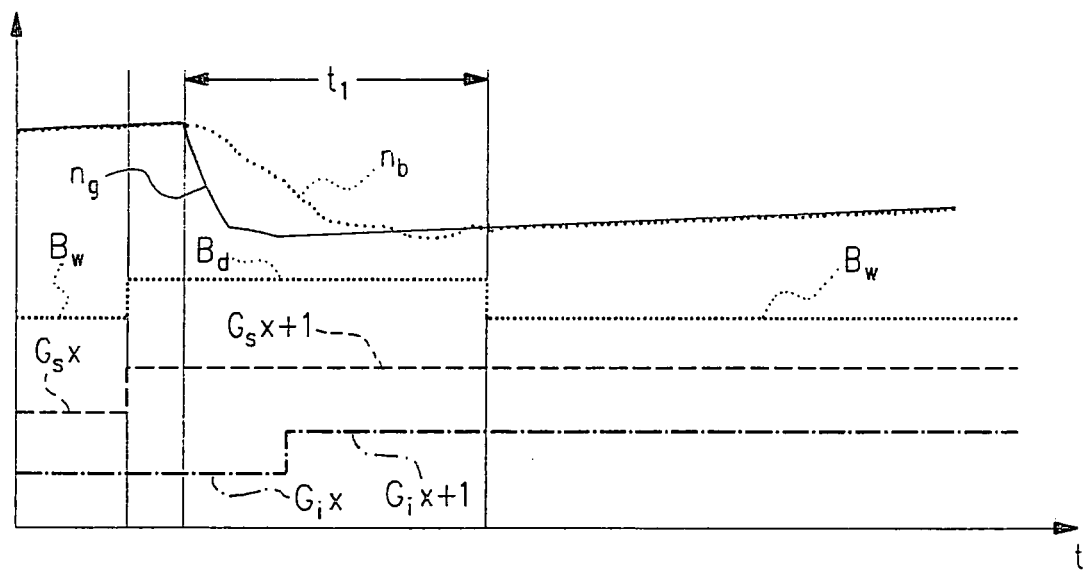
FIG. 3 shows a signal diagram for explaining a switching process of the automatic transmission supported by the electrical machine.

FIG. 3 shows the processes during the shifting procedure during an automatically initiated shifting procedure. The shifting command, by which the setpoint value for the currently present gear $G_S x$ is replaced by the setpoint value for the next-highest gear $G_S x+1$ (the exemplary embodiment shows a shift-up process), is used at the same time for the switchover from the efficiency optimal operating state Bw into the dynamically optimal operating state Bd. The shifting procedure is initiated only after that. Because of the rapid response behavior of electric machine 10, the time for the active synchronization may be kept short. Besides, one has to expect a rapid adjustment of setpoint values, which is of advantage in case of a possible synchronization without synchronizer rings in the transmission. After the transmission initial rotational speed $n_g$ has approached or come closer to the rotational speed of the internal combustion engine $n_b$ with the support of electric machine 10, the actual shifting process takes place, in which the actual value of transmission shifting step Gsubix changes to the actual value of the next-highest transmission step Gsubix+1. After the conclusion of the shifting process, which takes up time t1, there is a reverse switchover of the operating state of the electric machine from the dynamically optimal operating state Bd to efficiency optimal operating state Bw.

The switchover method of the operating states during shifting processes may also be used correspondingly for Dual-E transmissions.

What is claimed is:

1. An electric machine coupled to an internal combustion engine in a motor vehicle, comprising:
    a control device for specifying at least one of an optimal efficiency operating state and a dynamically optimal operating state for the electric machine; and
    means for switching over the usually-specified optimal efficiency operating state to the dynamically optimal operating state before operating procedures in the motor vehicle which require a rapid torque setting.

2. The electric machine according to claim 1, wherein the means for switching over includes a switchover control input for receiving control signals specifying a switchover before at least one of transmission shifting processes, starting processes of the engine and acceleration processes of the engine.

3. The electric machine according to claim 2, further comprising at least one of a central vehicle control, a transmission control device and a switching device adapted to be operated before at least one of the starting processes and the acceleration processes for forming the control signals specifying the switchover.

4. The electric machine according to claim 1, wherein the switchover is provided for one of (a) a specified time and (b) until a close of a respective operating process which requires a rapid torque setting.

5. The electric machine according to claim 1, wherein the control device specifies a flux-forming current and a torque-forming current for the electric machine.

6. The electric machine according to claim 5, wherein the control unit includes means for specifying a pair of values for the flux-forming current and the torque-forming current as a function of a respective torque requirement in the optimal efficiency operating state, and for specifying a nominal value for the flux-forming current and the torque-forming current as a function of a respective torque requirement in the dynamically optimal operating state.

7. The electric machine according to claim 1, wherein the electric machine is connected between the internal combustion engine and a vehicle transmission, the vehicle transmission being one of automatic and automated, a coupling being situated at least between the electric machine and the engine.

8. The electric machine according to claim 1, wherein the electric machine forms a generator.

9. The electric machine according to claim 1, wherein the electric machine forms a motor.

10. The electric machine according to claim 2, wherein the switchover control input includes a bus connection.

11. The electric machine according to claim 1, wherein:
the means for switching over includes a switchover control input for receiving control signals specifying a switchover before at least one of transmission shifting processes, starting processes of the engine and acceleration processes of the engine, and
the switchover is provided for one of (a) a specified time and (b) until a close of a respective operating process which requires a rapid torque setting.

12. The electric machine according to claim 11, further comprising at least one of a central vehicle control, a transmission control device and a switching device adapted to be operated before at least one of the starting processes and the acceleration processes for forming the control signals specifying the switchover.

13. The electric machine according to claim 11, wherein the control device specifies a flux-forming current and a torque-forming current for the electric machine.

14. The electric machine according to claim 13, wherein the control unit includes means for specifying a pair of values for the flux-forming current and the torque-forming current as a function of a respective torque requirement in the optimal efficiency operating state, and for specifying a nominal value for the flux-forming current and the torque-forming current as a function of a respective torque requirement in the dynamically optimal operating state.

15. The electric machine according to claim 11, wherein the electric machine is connected between the internal combustion engine and a vehicle transmission, the vehicle transmission being one of automatic and automated, a coupling being situated at least between the electric machine and the engine.

16. The electric machine according to claim 11, wherein the electric machine forms a generator.

17. The electric machine according to claim 11, wherein the electric machine forms a motor.

* * * * *